United States Patent [19]

Staples et al.

[11] Patent Number: 4,753,737

[45] Date of Patent: Jun. 28, 1988

[54] RECOVERY METHOD FOR SETTLED BLACK LIQUOR

[76] Inventors: Wesley Staples; Russell Staples, both of P.O. Box 149, Palatka, Fla. 32077

[21] Appl. No.: 117,985

[22] Filed: Nov. 9, 1987

[51] Int. Cl.[4] ............................................. B01D 29/00
[52] U.S. Cl. ..................... 210/720; 100/117; 100/145; 162/44; 162/56; 162/59; 210/805; 210/170; 210/242.1; 210/386
[58] Field of Search ............ 210/767, 386, 779, 416.1, 210/790, 791, 805, 153, 167, 170, 241, 242.1, 194, 195.1, 196, 197; 100/117, 145–150; 162/42–45, 56, 59, 52, 233–239, 210

[56] References Cited

U.S. PATENT DOCUMENTS

| 3,898,124 | 8/1975 | Olson | 162/238 |
| 3,989,588 | 11/1976 | Charters et al. | 162/234 |
| 4,039,373 | 8/1977 | Michelsen | 162/52 |

Primary Examiner—Frank Sever
Attorney, Agent, or Firm—Kerkam, Stowell, Kondracki & Clarke

[57] ABSTRACT

A recovery method for settled black liquor in ponds and lagoons is disclosed so that ponds and lagoons which can no longer be pumped to recovery evaporators and furnaces are reconstituted by augering the settled black liquor and passing the augered material through filters, partical micronization chambers and static mixers.

5 Claims, 2 Drawing Sheets

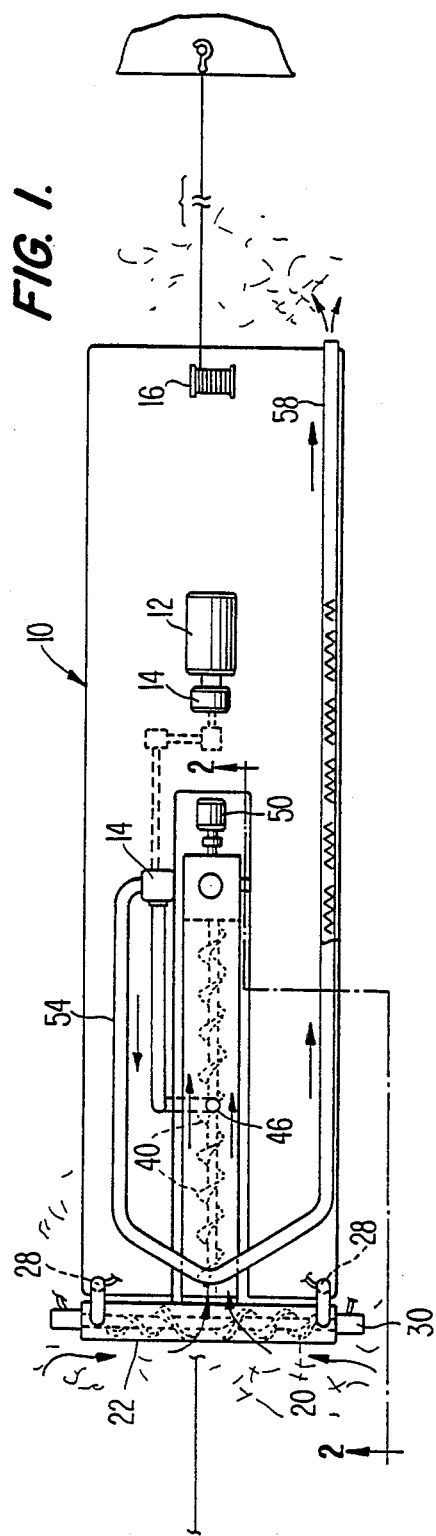
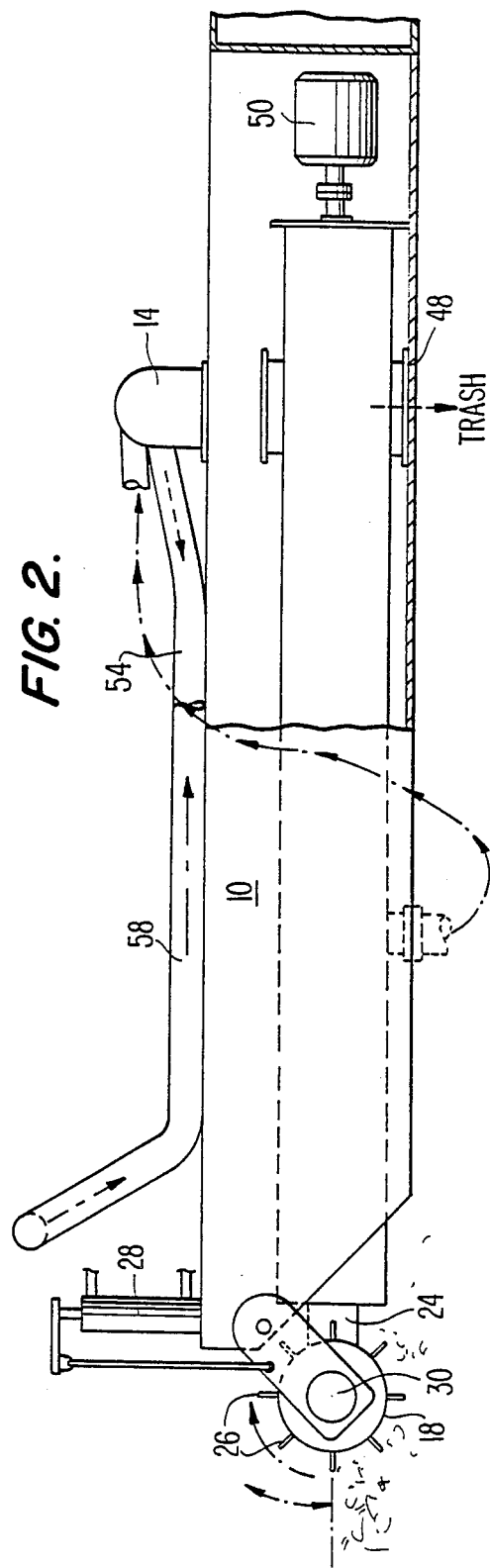

RECOVERY METHOD FOR SETTLED BLACK LIQUOR

FIELD OF THE INVENTION

This invention relates to a method for recovering settled black liquor in black liquor ponds and pools.

BACKGROUND OF THE INVENTION

In the Pulp and Paper Industry a very caustic solution called white liquor is used in the digesters for cooking wood chips for the production of pulp. This combination (wood chips & white liquor) is sealed and steam is introduced and it "cooks" under high pressure. After cooking this mixture is "blown" from the digester and goes through a seperation process. This process seperates the pulp from the liquid which is referred to as black liquor. The black liquor contains several by-products —turpentine and "soap" (from which tall oil is made) are two plus residual chemicals and B.T.U. (heat) values. After the by-products are removed, the black liquor contains chemical and B.T.U. solids in the magnatitude of about 10%. The higher the solids the higher the value of the black liquor. In order to recover the values this black liquor is processed through evaporators in which the water is removed and in several stages the solids content are raised to 55%–62% for burning in recovery boilers. In the burning process in the recovery boiler, the heat value is removed for the production of energy and the chemical element form a smelt matter called green liquor. This green liquor drops into a heat sink pool at the bottom of the boiler and is removed for processing through a lime kiln for the production of white liquor. Quite frequently, prior to recovery of the values in the black liquor, the black liquor is stored in ponds, pools and lagoons.

These large lagoons contain vast amounts of liquor ranging in solids content from weak 2%–20% to heavy 25%–50%. They may remain in such lagoon for months before limited recovery capacity can reclaim them back into the system (in some cases actually years). As the black liquor settles, the solids drop to the bottom of the pond as they fall out of solution and supension. Also the heavier the solids the faster they fall. This is especially true as the high processing temperatures fall in the lagoon environment. The black liquor solids form heavy thick layers over time and become quite firm. Over several years of operation the lagoons have thousands of dollars of value which is literally locked in. It must be pumpable to process. We have witnessed ponds which have actually filled up with these solids reducing the holding capacity of the lagoon to almost nothing. Removal of these solids can create an environmental problem if placed in a land fill.

BRIEF DESCRIPTION OF THE INVENTION

The invention generally comprises a recovery method for settled black liquor in ponds and pools comprising the steps: winching a processor through a black liquor pool while simultaneously augering and conveying settled black liquor solids into a micronization filtration unit, separating and ejecting debris from the black liquor in the filtration unit; directing the filtered black liquor to a slurry pump, pumping the slurry through a static mixing chamber and then pumping the resuspended black liquor back into the pool thereby increasing the pumpable solids content of black liquor in the pool.

BRIEF DESCRIPTION OF THE DRAWINGS

The invention will be descried in detail with reference to the accompanying drawings herein:

FIG. 1 is a top plan view of apparatus suitable for carrying out the method of the invention;

FIG. 2 is a side elevational view of the same apparatus with portions thereof broken away to show details of mechanisms;

DETAILED DESCRIPTION OF THE INVENTION

Figure 3:
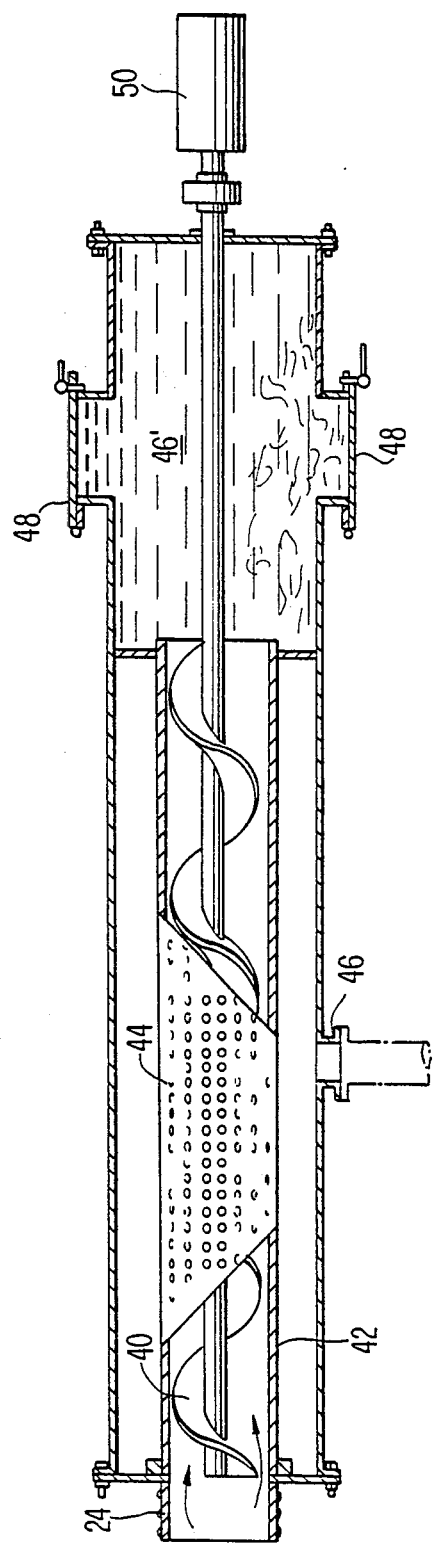
FIG. 3 illustrates in partial section, the main features of the micronization filter and trash removal system.

Referencing the drawings apparatus suitable for carrying out the present invention includes a flat-bottom barge 10 which by way of example, may be eight foot wide, twenty-four foot long and two feet deep. Basically the barge is constructed of rolled steel sheets.

The barge has, as a prime power source, designated 12 which in an illustrated form of the invention is a six cylinder air cooled turbo-charged Diesel engine. The prime mover operates a slurry pump 14 and from a stub-shaft the prime mover operates a hydraulic pump.

The barge moves through the pool or lagoon of black liquor by means of a pair of winches one at the rearward end designated 16 and a forward winch not shown the cables of which are anchored to the lagoon bank.

At the forward end of the barge is provided the auger head 18 having two flights 20 and 22 of augers with flight 22 extending from one side of the auger head to the center and the other flight from the opposite side to the center to feed augered material to an input throat 24. The auger head is fitted with digging tines 26. The auger head is raised and lower by a pair of hydraulic rams 28 powered from the prime mover and the auger is rotated by hydraulic motors conected to the through shaft of the auger one of which is generally designated 30. Settle and consolidated black liquor augered from the bottom of the lagoon is pulled by the micronization filtration unit into the throat by the auger as illustrated in FIG. 3. The micronization filtration unit consists of a hydraulically driven center shaft carrying auger flights 40 through a, for example, twelve inch pipe 42 having a internal screened tube section 44 which permits the passage of partially resuspended black liquor which passes from the filter housing via outlet 46. This internal screened tube section 44 not only allows for the passage of material but also serves as a shear plate, as the auger flights and the tube 44 are closely fitted, move the particles through the unit. The auger continues to carry rearwardly, trash and debris which does not pass through the openings 44 in the screened portion of the filter. This trash is dumped into a trash chamber 46' and periodically removed via clean out openings 48. Also in FIG. 3 it will be seen that the filter auger is driven by a hydraulic motor 50.

Another important function of the particle micronization filtration unit is the pumping action of the auger priming the surry pump. In the heavy solids which the head must cut this would be a big problem if it were not for this fact.

From the outlet 46 the material passes through hose 54 to pump 14 and the output from the pump directs the partially resuspended black liquor through the static mixers 56. The static mixers are housed in, for example, a six inch diameter PVC pipe. The static mixers 60 consists of approximately 12 inch segments of left and right hand stationary auger type flights welded to the a 2" steel pipe and allowing a two to three inch gap between the segments. In being pumped through the static mixers the unsuspended black liquor solids are basically completely solubleized and/or resuspended and the solubleized and/or resuspended materials flow back into the lagoon or pond at the outlet 58 of the static mixers. The material flowing back into the lagoon can then be pumped from the lagoon to the black liquor processing system here in before described.

We claim:

1. Recovery method for settled black liquor in ponds and pools comprising the steps: directing a processor through a black liquor pool while simultaneously augering and conveying settled black liquor solids from said pool into said processor; separating and ejecting debris from the black liquor; directing the black liquor to a slurry pump; and then pumping the resuspended black liquor back into the pool sufficient to increase the pumpable solids content of black liquor in the pool.

2. Recovery method for settled black liquor in ponds and pools comprising the steps: winching a processor through a black liquor pool while simultaneously augering and conveying settled black liquor solids from said pool into a micronization filtration unit, separating and ejecting debris from the black liquor in the filtration unit; directing the filtered black liquor to a slurry pump, pumping the slurry through static mixers and then pumping the resuspended black liquor back into the pool sufficient to increase the pumpable solids content of black liquor in the pool.

3. The method as defined in claim 2 wherein the black liquor is subjected to a plurality of mixing veins in the static mixers.

4. The method as defined in claim 3 wherein the depth of the augering and conveying step is controllable by hydraulic rams.

5. The method as defined in claim 4 wherein the augered material is converyed through the micronization filtration unit by a screw flight driven by a hydraulic motor.

* * * * *